(12) United States Patent
DeLuga et al.

(10) Patent No.: US 7,388,745 B2
(45) Date of Patent: Jun. 17, 2008

(54) PORTABLE COMPUTER POWER SYSTEM

(75) Inventors: Ronald E. DeLuga, Spring, TX (US); Earl Moore, Cypress, TX (US); Paul Doczy, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 394 days.

(21) Appl. No.: 11/002,688

(22) Filed: Dec. 2, 2004

(65) Prior Publication Data

US 2006/0120037 A1 Jun. 8, 2006

(51) Int. Cl.
*H05K 7/20* (2006.01)
(52) U.S. Cl. ........................ 361/690; 361/692
(58) Field of Classification Search ............... 361/690, 361/692
See application file for complete search history.

(56) References Cited

U.S. PATENT DOCUMENTS

| | | | | |
|---|---|---|---|---|
| 4,744,005 A * | 5/1988 | Milani | ........................ | 361/687 |
| 5,594,617 A * | 1/1997 | Foster et al. | ................. | 361/679 |
| 5,768,101 A * | 6/1998 | Cheng | ......................... | 361/687 |
| 5,959,836 A * | 9/1999 | Bhatia | ......................... | 361/687 |
| 6,058,009 A * | 5/2000 | Hood et al. | ................. | 361/687 |
| 6,094,347 A * | 7/2000 | Bhatia | ......................... | 361/695 |
| 6,109,039 A * | 8/2000 | Hougham et al. | ............. | 62/3.7 |
| 6,239,970 B1* | 5/2001 | Nakai et al. | ................. | 361/695 |
| 6,239,971 B1* | 5/2001 | Yu et al. | ...................... | 361/695 |
| 6,259,601 B1* | 7/2001 | Jaggers et al. | .............. | 361/690 |
| 6,275,945 B1* | 8/2001 | Tsuji et al. | .................. | 713/300 |
| 6,353,536 B1* | 3/2002 | Nakamura et al. | ........... | 361/686 |
| 6,459,574 B1* | 10/2002 | Ghosh | ......................... | 361/687 |
| 6,522,535 B1* | 2/2003 | Helot et al. | ................. | 361/687 |
| 6,563,703 B2* | 5/2003 | Xie | ............................. | 361/687 |
| 6,574,102 B2* | 6/2003 | Usui et al. | ................... | 361/687 |
| 6,687,123 B2* | 2/2004 | Kitahara | ...................... | 361/695 |
| 6,691,197 B2* | 2/2004 | Olson et al. | ................. | 710/304 |
| 6,822,856 B2* | 11/2004 | Fujiwara | ..................... | 361/681 |
| 6,956,734 B2* | 10/2005 | Shin et al. | ................... | 361/683 |
| 7,019,968 B2* | 3/2006 | Kitahara | ...................... | 361/695 |
| 2002/0085351 A1* | 7/2002 | Ghosh | ......................... | 361/687 |
| 2005/0168937 A1* | 8/2005 | Yin et al. | .................... | 361/686 |

* cited by examiner

*Primary Examiner*—Anatoly Vortman

(57) ABSTRACT

A portable computer power system comprises a battery an external battery housing providing an airflow path therethrough into an airflow vent of a portable computer.

20 Claims, 1 Drawing Sheet

PORTABLE COMPUTER POWER SYSTEM

BACKGROUND OF THE INVENTION

As the performance capabilities of portable computing devices increases, the power requirements of the portable computing device also generally increases. As a result, dissipation of the thermal energy generated by electronic components of the portable computing device is generally necessary to maintain proper and continued operation of the computing device. For example, portable computing devices generally include vents to enable thermal energy dissipation associated with processors and other types of electronic components. However, because the surface area on portable computing devices is limited, placement and/or attachment of batteries and/or other types of devices relative to the portable computing device may impede or otherwise interfere with cooling of the portable computing device.

BRIEF DESCRIPTION OF THE DRAWINGS

For a more complete understanding of the present invention and the advantages thereof, reference is now made to the following descriptions taken in connection with the accompanying drawings in which.

DETAILED DESCRIPTION OF THE DRAWINGS

Figure 1:
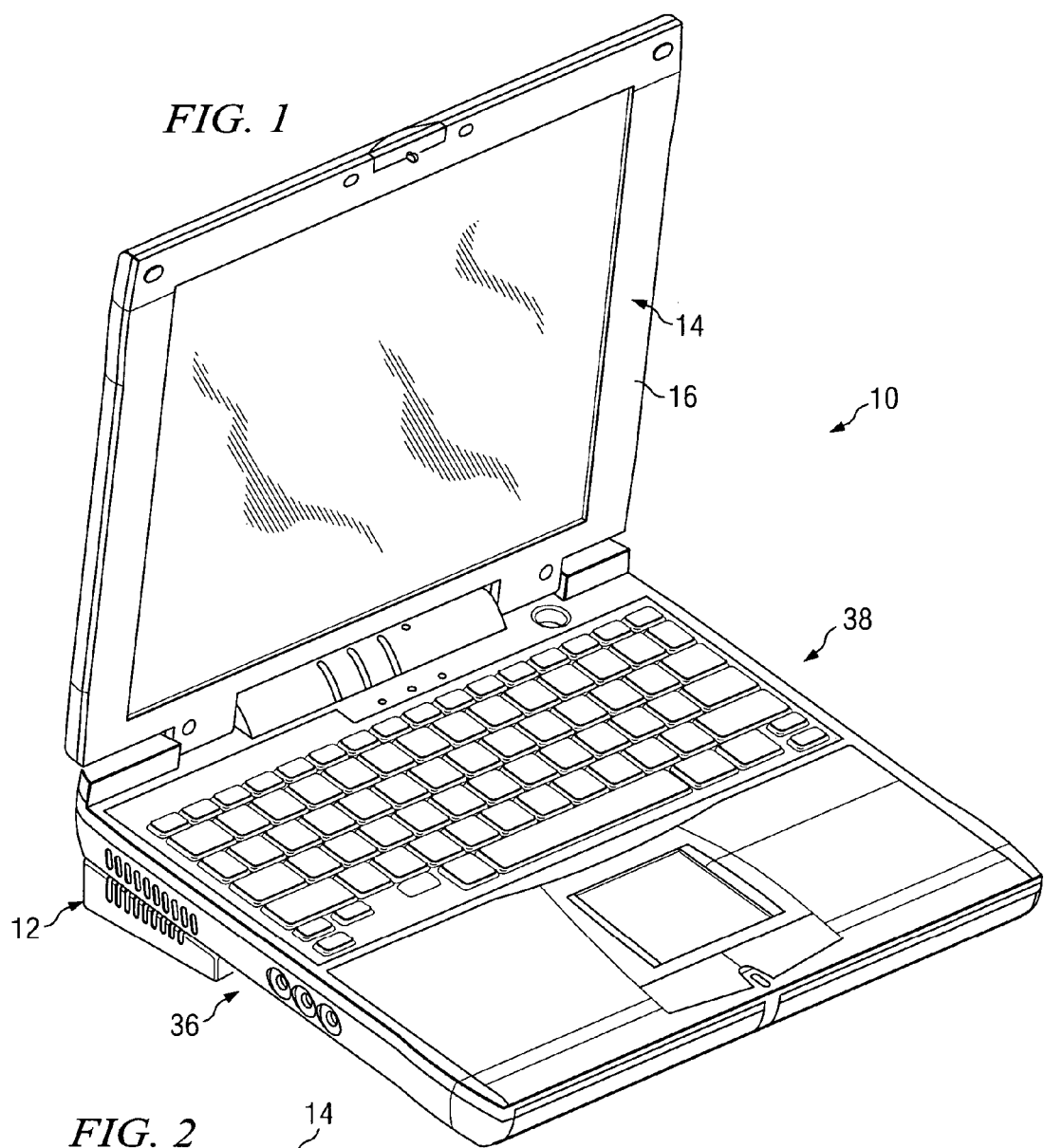
FIG. 1 is a diagram illustrating an embodiment of a portable computer power system in accordance with the present invention.
Figure 2:
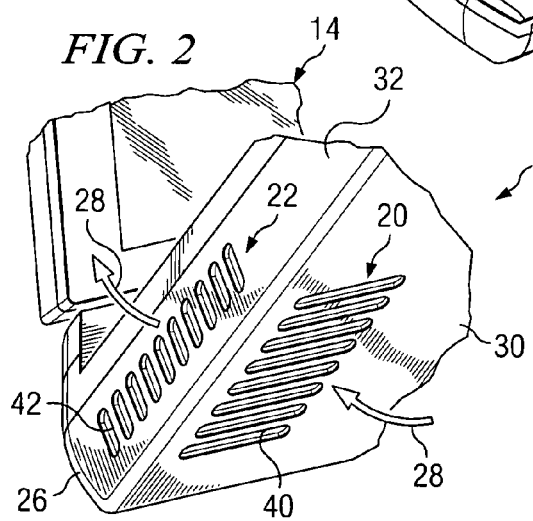
FIG. 2 is a diagram illustrating an isometric view of a side and bottom portion of portable computer in which an embodiment of a portable computer power system has been employed to advantage.
Figure 3:
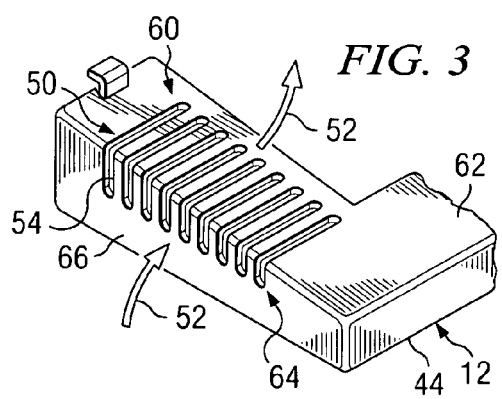
FIG. 3 is a diagram illustrating an embodiment of a battery of a portable computer power system in accordance with the present invention.

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of a portable computer power system 10 in accordance with the present invention. In the embodiment illustrated in FIG. 1, system 10 comprises an external battery 12 coupled to a portable computer 14. In the embodiment illustrated in FIG. 1, portable computer 14 comprises a laptop or notebook computer 16. However, it should be understood that portable computer 14 may comprise other types of portable computing devices.

FIG. 2 is a diagram illustrating an isometric view of a side and bottom portion of portable computer 14 in accordance with an embodiment of the present invention. In the embodiment illustrated in FIG. 2, portable computer 14 comprises airflow vents 20 and 22 for providing an airflow path through a base member 26 of portable computer 14, indicated generally by 28, to enable dissipation of thermal energy generated by portable computer 14 within base member 26 via active and/or passive methods (e.g., via convection and/or a fan-generated airflow). For example, in the embodiment illustrated in FIG. 2, airflow vent 20 is disposed on a bottom surface 30 of portable computer 14 (e.g., a surface of portable computer 14 generally disposed against or toward a support surface such as a desk or table) and airflow vent 22 is disposed on a side or lateral surface 32 of base member 26. However, it should be understood that airflow vent 22 may be located elsewhere on base member 26 (e.g., on a back or rear surface of base member 26). As used herein, a "lateral" location or side relative to portable computer 14 refers to a location or side indicated generally by 36 and/or 38 in FIG. 1. Referring to FIG. 2, airflow vents 20 and 22 each comprise a plurality of spaced-apart elongated openings or apertures 40 and 42, respectively. However, it should be understood that airflow vents 20 and/or 22 may be otherwise configured. Additionally, in the embodiment illustrated in FIG. 2, airflow vent 20 comprises an intake vent and airflow vent 22 comprises an exhaust vent such that the airflow path through base member 26 enters base member 26 through airflow vent 20 and is exhausted from base member 26 through airflow vent 22, as illustrated by 28. However, it should be understood that the direction of airflow through base member 26 may be otherwise configured.

FIG. 3 is a diagram illustrating a portion of battery 12 in accordance with an embodiment of the present invention. In the embodiment illustrated in FIG. 3, battery 12 comprises a battery housing 44 having an airflow vent 50 disposed therein for forming an airflow path through at least a portion of battery housing 44 as generally illustrated by 52. For example, in the embodiment illustrated in FIG. 3, airflow vent 50 comprises a plurality of spaced-apart elongated openings or apertures 54 to enable an airflow to pass through at least a portion of battery housing 44. However, it should be understood that airflow vent 50 may be otherwise configured.

Referring to FIGS. 1-3, in operation, battery 12 is configured to enable an airflow through portable computer 14 via airflow vents 20 and 22 when battery 12 is attached to portable computer 14. For example, in operation, airflow vent 50 is configured and/or located on battery housing 44 to coincide or correspond at least partially to a location and/or configuration of airflow vent 20 disposed on portable computer 14 such that, upon installation or attachment of battery 12 to portable computer 14, airflow vent 50 is at least partially aligned with airflow vent 20 to enable an airflow path through base member 26 via airflow vent 20 (e.g., by way of airflow vent 50) which may otherwise be covered or otherwise impeded by the attachment of battery 12 to portable computer 14. For example, as best illustrated in FIG. 3, at least a portion 60 of airflow vent 50 is disposed on a top surface 62 of battery housing 44 adapted to be disposed at least partially facing, adjacent or against surface 30 of portable computer 14 when battery 12 is attached or otherwise secured to portable computer 14 (e.g., coupled at least partially to surface 30 of portable computer 14). Additionally, in the embodiment illustrated in FIG. 3, at least a portion 64 of airflow vent 50 is disposed on or otherwise extends to a side or lateral surface 66 of battery housing 44 when battery 12 is attached or otherwise secured to portable computer 14.

Thus, referring to FIGS. 1-3, in operation, when battery 12 is attached or otherwise coupled to portable computer 14, airflow vent 50 of battery 12 is configured to be at least partially aligned with airflow vent 20 of portable computer 14 to enable an airflow path through portable computer 14 via battery housing 44. For example, in operation, when battery 12 is attached or otherwise coupled to portable computer 14, portion 60 of apertures 54 of airflow vent 50 are at least partially disposed in alignment with apertures 40 of airflow vent 20. Additionally, because airflow vent 50 extends at least partially onto side or lateral surface 66 of battery housing 44, airflow vent 50 provides an airflow path from a side or lateral area relative to portable computer 14 to airflow vent 20. In the embodiment of the present invention illustrated in FIG. 3, airflow vent 50 is configured having apertures 54 extending from surface 62 to surface 66 of battery housing 44. However, it should be understood that airflow vent 50 may be otherwise configured. For example, in other embodiments of the present invention, airflow vent 50 may be configured using two or more discrete or separated vents (e.g., an airflow vent disposed on surface 62 separate and apart from an airflow vent disposed on surface 66 such that portions 60 and 64 are not formed or otherwise connected by continuous apertures 54). Additionally, in the embodiment of the present invention illustrated in FIG. 3, airflow vent 50 is illustrated as extending to a side or lateral area of portable computer 14 when battery 12 is attached or otherwise coupled to portable computer 14. However, it should be understood that airflow vent 50 may be configured to extend to different locations or areas relative to portable computer 14 (e.g., a back or rearward surface of battery housing 44). Additionally, in the embodiment of the present invention illustrated in FIG. 3, an airflow path direction as indicated by 52 in FIG. 3 corresponds to the airflow path direction indicated by 28 in FIG. 2. However, it should be understood that the airflow path direction through battery 12 may be otherwise configured to correspond to the airflow path direction through portable computer 14.

Thus, embodiments of the present invention enable thermal energy dissipation from base member 26 of portable computer 14 while battery 12 is attached or otherwise coupled to portable computer 14 by forming an airflow path through battery housing 44 corresponding to airflow vents disposed on portable computer 14.

What is claimed is:

1. A portable computer battery system, comprising:
an external battery housing having an airflow vent comprising a plurality of apertures, the apertures formed on a first exterior surface of the battery housing and extending to a second exterior surface of the battery housing, the airflow vent providing an airflow path therethrough into an airflow vent of a portable computer, and wherein an airflow enters the external battery housing through a first portion of the plurality of apertures and exits the battery housing through a second portion of the plurality of apertures.

2. The system of claim 1, wherein the airflow vent of the battery housing is positioned to correspond with a location of the airflow vent of the portable computer.

3. The system of claim 1, wherein the airflow vent of the battery housing is positioned to be aligned at least partially with the airflow vent of the portable computer.

4. The system of claim 1, wherein at least a portion of the airflow vent of the battery housing is located to be aligned with an airflow vent disposed on a bottom surface of the portable computer.

5. The system of claim 1, wherein the battery housing is adapted to be coupled to a bottom surface of the portable computer.

6. The system of claim 1, wherein the plurality of apertures extends from a side surface of the battery housing to a surface of the battery housing corresponding to a location of the airflow vent of the portable computer.

7. The system of claim 1, wherein the battery housing is adapted to form an airflow path extending from a side surface of the battery housing to a side area of the portable computer.

8. The system of claim 1, wherein the battery housing is adapted to form an airflow path extending from a top surface of the battery housing to a bottom surface of the portable computer.

9. A battery for a portable computer, the battery comprising:
housing means having a vent means comprising a plurality of apertures, the plurality of apertures formed on a first exterior surface of the housing means and extending to a second exterior surface of the housing means, the vent means for providing an airflow path therethrough into an airflow vent of the portable computer, and wherein an airflow enters the housing means through a first portion of the plurality of apertures and exits the housing means through a second portion of the plurality of apertures.

10. The battery of claim 9, wherein the vent means forms an airflow path extending through the housing means to a bottom surface of the portable computer.

11. The battery of claim 9, wherein the vent means is positioned to be at least partially aligned with the airflow vent of the portable computer when the battery is coupled to the portable computer.

12. A portable computer battery system, comprising:
a housing having an airflow vent comprising a plurality of apertures, the plurality of apertures formed on a first exterior surface of the housing and extending to a second exterior surface of the housing, the airflow vent positioned to correspond at least partially to a location of an airflow vent of a portable computer when the battery is coupled to the portable computer, and wherein an airflow enters the housing through a first portion of the plurality of apertures and exits the housing through a second portion of the plurality of apertures.

13. The system of claim 12, wherein the airflow vent of the battery housing extends from a side surface of the battery housing to a surface of the battery housing corresponding to the location of the airflow vent of the portable computer when the battery is coupled to the portable computer.

14. The system of claim 12, wherein the airflow vent of the battery housing is adapted to be aligned at least partially with the airflow vent of the portable computer.

15. The system of claim 12, wherein the battery housing is adapted to be coupled at least partially to a bottom surface of the portable computer.

16. The system of claim 12, wherein the airflow vent of the battery housing is adapted to form an airflow path extending from a side surface of the battery housing to the airflow vent of the portable computer when coupled to the portable computer.

17. The system of claim 12, wherein the airflow vent of the battery housing, when the battery is coupled to the portable computer, extends from a bottom surface of the portable computer to a side area of the portable computer.

18. The system of claim 1, wherein the first and second exterior surfaces comprise adjacent exterior surfaces of the battery housing.

19. The battery of claim 9, wherein the first and second exterior surfaces comprise adjacent exterior surfaces of the housing means.

20. The system of claim 12, wherein the first and second exterior surfaces comprise adjacent exterior surfaces of the battery housing.

* * * * *